United States Patent [19]

Jonda

[11] 4,048,360
[45] Sept. 13, 1977

[54] LOW-WEIGHT DENT-RESISTANT STRUCTURE AND METHOD FOR PRODUCTION THEREOF

[75] Inventor: Wolfgang Jonda, Oberpframmern, Germany

[73] Assignee: Messerschmitt-Bolkow-Blohm Gesellschaft mit beschrankter Haftung, Munich, Germany

[21] Appl. No.: 571,491

[22] Filed: Apr. 24, 1975

[30] Foreign Application Priority Data

Apr. 25, 1974   Germany .............................. 2419999

[51] Int. Cl.² .......................... D02G 3/00; B32B 5/12
[52] U.S. Cl. ........................................ 428/35; 52/731;
156/173; 264/DIG. 81; 428/113; 428/114;
428/119; 428/188; 428/377
[58] Field of Search ................ 428/119, 247, 186, 188,
428/224, 255, 256, 35, 179, 36, 251, 252, 228,
113, 114, 377; 264/DIG. 81; 156/173, 189;
52/720, 729, 731; 242/7.03, 7.21

[56] References Cited

U.S. PATENT DOCUMENTS

| | | | |
|---|---|---|---|
| 2,105,324 | 1/1938 | Hutteman | 428/247 |
| 3,544,417 | 12/1970 | Corzine | 428/188 |

Primary Examiner—George F. Lesmes
Assistant Examiner—P. J. Thibodeau
Attorney, Agent, or Firm—Toren, McGeady and Stanger

[57] ABSTRACT

A low-weight, dent-resistant hollow structure composed of spaced apart outer sheets and an inner supporting core, the inner supporting core being formed from a plurality of rigid fibrous nets impregnated with a hardened resin, some of said nets being parallel to and contiguous with the outer sheets and other of said nets being disposed perpendicularly to and secured to the parallel nets so as to maintain the outer sheets in a spaced apart position. Such structures are particularly useful in devices for aviation and space travel.

Methods for forming the structure are disclosed herein.

3 Claims, 4 Drawing Figures

LOW-WEIGHT DENT-RESISTANT STRUCTURE AND METHOD FOR PRODUCTION THEREOF

BACKGROUND OF THE INVENTION

1. Field of the Invention

The present invention relates to low-weight dent-resistant hollow structures. Particularly, the present invention concerns structures composed of outer sheets having a supporting core enclosed between the outer sheets or cover plates.

2. Background of the Invention

In structures for use in aviation and space travel, it has been conventional to utilize sheets of materials which are reinforced with fibers. Particularly, for example, fiber-reinforced plastic sheeting has been used. Generally, it is desired that such structures possess relatively thin outer walls, i.e., the walls being formed from the fiber reinforced plastic sheeting. However, such thin wall thicknesses are extremely costly to produce and are subject to denting and/or bulging stresses which are particularly harmful in use. Consequently, attempts have been made to provide structures wherein such outer cover sheets are supported by means of a foamed core or by a core composed of a sandwich structure having a honeycomb formation. In such cases, however, the supporting effect of the core is either insufficient, or, in the case of the honeycomb core, the stress resistance is only in the loading direction which is substantially at a right angle to the surface of the sandwich structure.

Thus, such cores provide inadequate protection with respect to denting failures resulting from stress from several different directions.

Such sandwich structures conventionally used also have the disadvantage in that the materials from which they are formed are often incompatible with the outer sheet material with respect to their thermal properties. For example, due to the difference in the coefficients of thermal expansion between the top or covering layer and the supporting core material, delamination and ultimate disappearance of the dent-resistant properties often occur. Moreover, it is also possible, under the conditions of use, that the core may deteriorate or release gases which can completely prohibit the use of such materials in certain cases.

SUMMARY OF THE INVENTION

I have discovered a new lightweight, dent-resistant hollow structure of the type described hereinabove which avoids many of the difficulties encountered with the prior art structures. Particularly, I have found that by utilizing an inner supporting core between the two spaced apart outer cover sheets which is composed of a series of rigid support sheets made from resin-reinforced fibers in the form of a net, and wherein at least one of the support sheets is parallel to and contiguous with each of the outer cover sheets and other of the support sheets are disposed perpendicularly to and secured to the parallel support sheets so as to maintain the outer sheets in the spaced apart position, excellent resistance to denting and bulging stresses from all directions can be obtained. Moreover, the supporting core utilized in the present invention is relatively light in weight and inexpensive to manufacture.

Additionally, by virtue of the similarity of the resin-reinforced fibrous net utilized in the core of the present invention and the fiber-reinforced plastic sheets utilized for the outer cover sheets, the problems with respect to differing thermal properties are minimized.

DESCRIPTION OF THE PREFERRED EMBODIMENT

Figure 1:
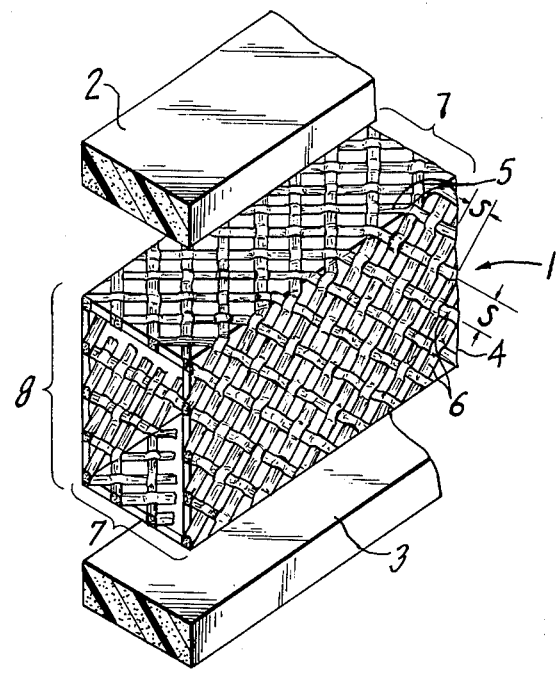
FIG. 1 is a cross sectional perspective view of a dent-resistant structure in accordance with the present invention.

Referring now to the drawings, and particular to FIG. 1, a supporting core or girder designated generally as 1 is shown interposed between outer cover sheets 2 and 3. Such outer cover sheets are conventionally formed from fiber-reinforced plastic sheeting, although metal may also be used. Generally, however, the fiber-reinforced plastics are superior in strength to metals, particularly, in the direction of the fibers which are incorporated into the plastics.

Supporting core 1 is formed from a sheet which is composed of fibers designated generally as 4 and 5, which fibers have been impregnated with a hardenable resin. Fibers 4 and 5 are intermeshed so as to form a net-like structure.

By the term "net", "netting" or "net-like structure", it is meant that the fibers crisscross one another so as to form a multiplicity of interstitial spaces or mesh apertures designated generally as 6.

The netting formed by fibers 4 and 5 is rigid as a result of the fibers having been impregnated with a hardenable resin and followed by hardening of the resin.

While various types of fibers can be used for the netting of the present invention, glass fibers and carbon fibers are particularly suitable.

The resins used for such purpose are well known and conventional in the art. Generally, they are resins which are in the form of a liquid or may be placed into a liquid form by dissolution in a solvent. The resins may then be hardened by the conventional drying and curing techniques, e.g. heating.

Typical of such resins are duroplasts which are cross-linkable from the liquid phase, e.g., polyurethane resins, epoxy resins, and polyimide resins.

More particularly, the supporting core or girder 1 is formed from two sheets of said hardened netting which are parallel to and contiguous with the inner surfaces of the outer sheets. While, for purposes of clarity, the entire structure is shown in an expanded or open form, it is understood, that in use, parallel sheets 7 are in direct contact with the inner surfaces of the outer covering sheets 2 and 3.

Further, the supporting core or girder is composed of sheets of the hardened webbing designated as 8, which are disposed perpendicularly to and are secured to the parallel support sheets 7. Thus, the combination of parallel support sheets 7 and perpendicular support sheets 8 form a girder having a rectangular cross section.

While is it possible for parallel support sheets 7 and perpendicular support sheets 8 to be separate sheets which are adhered together by conventional adhesive or cement, it is preferred that the entire support core or girder 1, when it is in the form shown in FIG. 1, is made from one continuous piece.

The lightweight, dent-resistant hollow structure of the present invention and, particularly, the embodiment shown in FIG. 1, may be prepared by first winding a fiber about a mandrel having the desired shape. In the case of the embodiment shown in FIG. 1, the mandrel would, of course, have a rectangular shape. Typically, the mandrel is in rotation and the yarn or fiber to be wrapped therearound is fed to the mandrel by means of a reciprocating thread guide.

By virtue of the use of the mandrel and thread-feeding mechanism, both of which are conventional in the art, the mesh aperture of the netting may be controlled by controlling the number of revolutions of the mandrel per unit of time and the speed of the reciprocating thread guide. Additionally, it should be noted that the effective wall thickness of the final structure of the present invention can be controlled by virtue of the cross section of the webbing used or fibers used to make the web.

It is also possible to form such a net by means other tha winding on a mandrel. That is to say, the net can be preformed and the preformed net can be wrapped about the mandrel.

In either case, the fibers to be wound upon the mandrel or the preformed netting is impregnated with the desired hardenable resin. Such impregnation can be carried out by dipping, spraying and other techniques known to the skilled artisan. Thereafter the impregnated material is wound or placed about the mandrel, the outer sheets 2 and 3 are placed in position in contact with parallel sheets 7 of the netting, and the entire assembly is subjected to the appropriate hardening treatment for the particular resins used. Such a hardening treatment serves not only to make the netting itself rigid and to secure the cross fibers to one another, but also to secure outer sheets 2 and 3 to parallel sheets 7.

After the hardening treatment, the assembly may be removed from the mandrel and is ready for further processing or use.

It is understood, of course, that the form of the mandrel, can take any shape depending on the specific shape of the final dent-resistant structure. Generally, however, it is preferable that the mandrel be either rectangular, square, or circular, since these forms yield the best properties. It is further noted that while the fibers may be disposed at various angles in the net, it is preferable that they be disposed at an angle of about 45° to the longitudinal axis of the mandrel.

Additionally, in the hardening process described above, it is preferable to first submit the mandrel with the fibers wound thereupon to an initial hardening treatment to partially gel the resin. Thereafter, the outer sheets 2 and 3 may be contacted with parallel sheets 7 and the final cementing and hardening effected.

In another embodiment, it is possible for the net, on the mandrel, to be completely hardened. Thereafter, the formed girder may be secured to the outer sheets using conventional adhesives suitable for such purposes.

Figure 2:
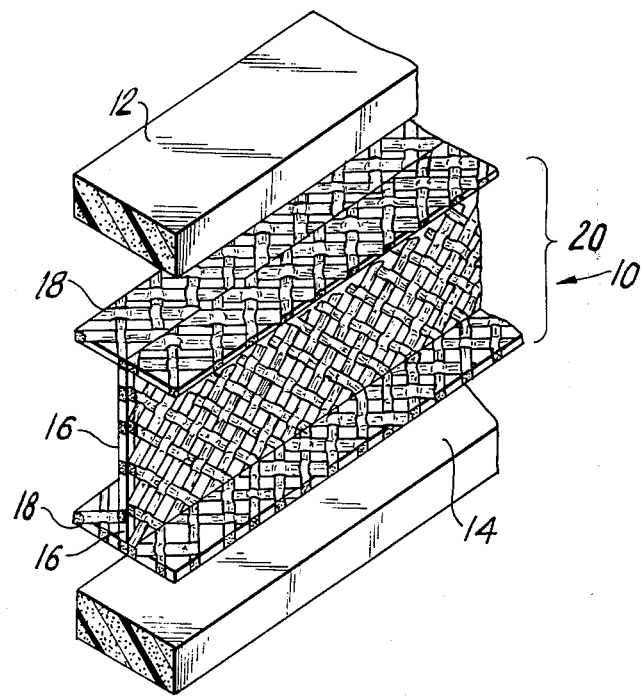
FIG. 2 is a view similar to that of FIG. 1 showing yet another embodiment of the present invention.

FIG. 2 shows yet another embodiment of the dent-resistant structure of the present invention which possesses a supporting core or girder in the shape of what will hereinafter be designated as an "I beam" structure 10 disposed between outer sheets 12 and 14. Support core or girder 10 also possesses perpendicular hardened sheets of netting 16 and parallel sheets 18. The "I beam" structure may be fabricated by first forming a hardened rectangular or square shaped rigid netting structure as designated by structure 1 in FIG. 1. This may be accomplished by disposing either a preformed netting or fibers on a rectangular shaped mandrel in accordance with the process described hereinabove. Of course, the preformed nettings or fibers have been previously impregnated with a hardenable resin.

Thereafter, the impregnated netting is subjected to hardening conditions on the mandrel. The thus hardened rectangular or square cross sectioned rigid net structure is removed from the mandrel and cut in half so as to form two ⌴-shaped structures designated generally as 20 in FIG. 2.

Each of these ⌴-shaped structures having bottom sides 16 are than placed in an abutting relationship so that they are back to back, i.e., side 16 of one of ⌴-shaped structure 20 abuts side 16 of the other ⌴-shaped structure 20. The abutting relationship is secured by utilizing conventional cement such that the "I beam" structure shown as 10 in FIG. 2 is thus obtained.

Thereafter, the core structure can be placed between outer sheets 12 and 16 and secured thereto with conventional adhesive and cement materials which are well known in the art.

It will be seen that, by virtue of the relatively open network rigid core supporting structure of the present invention, extremely lightweight and strong elements may be obtained for use as reinforcements to produce dent-resistant structures composed of two outer sheets and a supporting core. Particularly, by virtue of the unidirectionally extending fibers from which the rigid nets of the supporting core of the present invention are formed, protection against stress in many directions may be effected.

Figure 3:
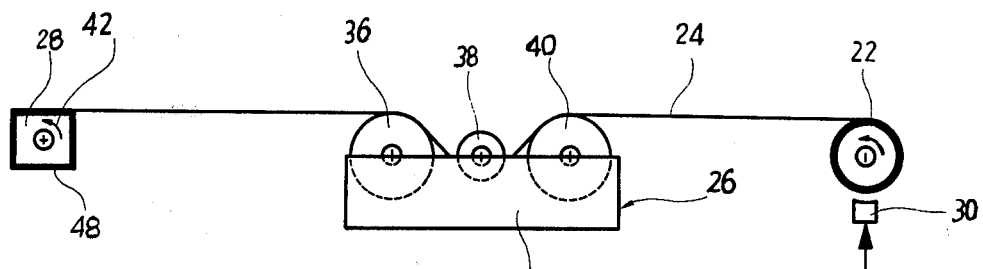
FIG. 3 is a schematic view of a process in accordance with the present invention.
Figure 4:
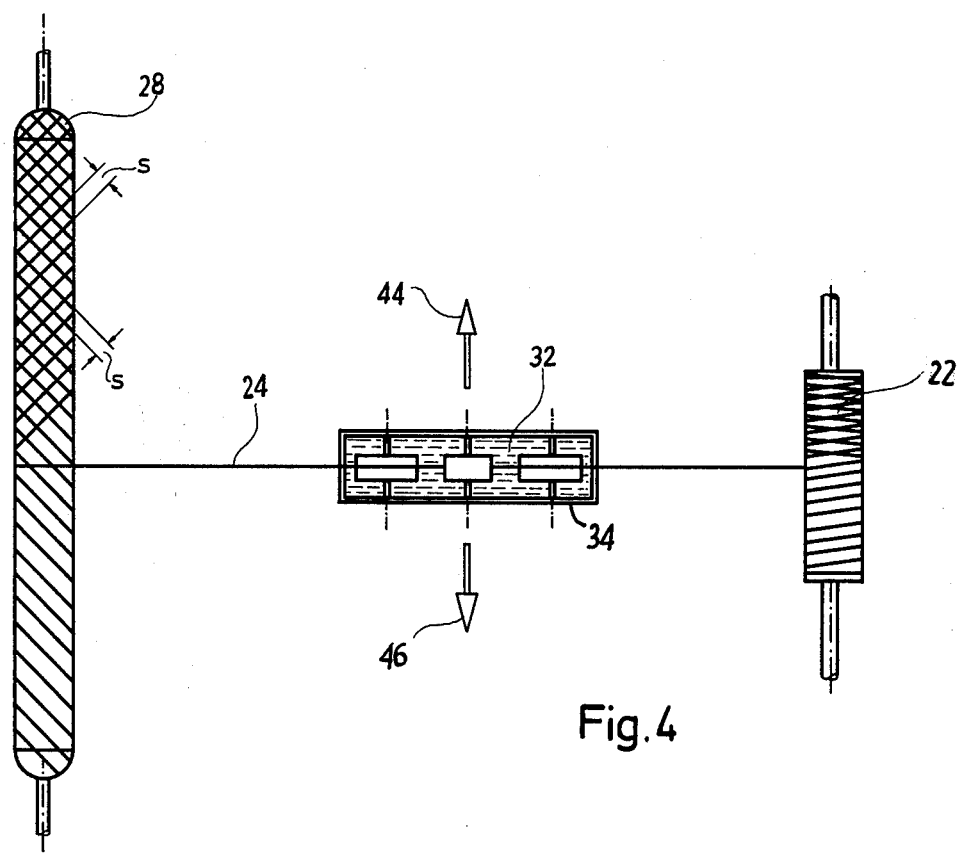
FIG. 4 is a plan view of the apparatus shown schematically in FIG. 3.

Referring now to FIGS. 3 and 4, a schematic diagram and a plan view of a process carried out in accordance with the present invention are shown, respectively. As shown, a fibre bundle or strand 24, which is taken from a roll thereof 22, is passed through a synthetic resin bath 26 and is wound on a square winding mandrel 28 which turns in the direction of arrow 42. Tension is applied to roll 22 by block member 30 during the winding procedure. The block member 30 presses against the roll to cause such tension.

The synthetic resin impregnation bath 26 consists of a container 34 filled with synthetic resin 32 and the fibre bundle or strand 24 is guided within this bath about three rolls, 36, 38 and 40.

Winding mandrel 28 is mounted in a winding machine (not shown) of the conventional construction such that mandrel 28 can be driven in the direction indicated by arrow 42.

The winding procedure takes place in such a manner that the fibre bundle or strand 24 is secured on the mandrel 28 and the motion of the mandrel draws the yarn from roll 22 through the impregnating bath 34.

Referring to FIG. 4, during the winding procedure, the fibre yarn roll 22 and the impregnation bath 34 are guided jointly in the directions of arrows 44 and 46, i.e., in a reciprocal motion along the longitudinal axis of mandrel 28. In this manner, the width referred to as $s$ of the net of the supporting body being formed on the mandrel is controlled by the number of revolutions per unit time of the mandrel 28 in relation to the reciprocating speed of the synthetic resin bath 34 in conjunction with the yarn roll 22. Thus, the spacing $s$ of the net can be easily controlled, and also, the thickness of the net by virtue of overlapping of the yarn can be controlled. Consequently, this process gives complete versatility in controlling the strength of the supporting body since, one of the factors in determining such strength is the number of windings of the mandrel.

After the winding procedure has been completed, the finished square supporting body designated as 48 in FIG. 3 is allowed to gell slightly, i.e., the resin is prehardened, such that the net can be taken from the mandrel 28 and handled without effecting its shape. It can then be finally hardened and then adhesively united with the cover elements in accordance with the description in FIGS. 1 and 2.

The following example illustrates the present invention:

A strand of carbon fibre (Thurnel 50) was impregnated in an impregnating bath consisting of an epoxy resin mixture containing 100 parts by weight of an epoxy resin commercially available under the name "Epicote 828", 84 parts by weight of a cross-linker available commercially under the name of "Epicure DX 126" and one part by weight of an accelerator, such as that commercially available in the trade and known as BDMA. The thus impregnated yarn was then wound onto a mandrel with an angular speed of 30 r.p.m. The cover elements or sheets were produced from a unidirectional composite material consisting of 60 percent by volume of Thornel 50 and 40 percent by volume of a resin mixture as described above in the epoxy bath.

After the adhesive uniting of the finish-wound supporting body with the cover elements, the finished structural element thus obtained was hardened or cured at 120° C for 8 hours.

What is claimed is:

1. In a lightweight dent-resistant hollow structure of the type composed of two spaced apart outer sheets and an inner supporting core, the improvement which comprises said supporting core being composed of a series of rigid support sheets composed of resin-reinforced fibers in the form of a net, wherein at least one support sheet is parallel to and contiguous with each outer sheet and a plurality of said support sheets are disposed perpendicularly to and are secured to the parallel support sheets to maintain the outer sheets in said spaced apart position.

2. The structure of claim 1 wherein said supporting core possesses a rectangular cross section.

3. The structure of claim 1 wherein said supporting core possesses an "I beam" shaped cross section.

* * * * *